United States Patent
Bell et al.

(10) Patent No.: US 10,801,871 B2
(45) Date of Patent: Oct. 13, 2020

(54) INTEGRATED BRACE BAR

(71) Applicant: Micro Motion, Inc., Boulder, CO (US)

(72) Inventors: Mark James Bell, Longmont, CO (US); Joel Weinstein, Boulder, CO (US); Mitalee Nayan Desai, Boulder, CO (US); Clinton R. Griffin, Erie, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 16/640,969

(22) PCT Filed: Aug. 29, 2017

(86) PCT No.: PCT/US2017/049121
§ 371 (c)(1),
(2) Date: Feb. 21, 2020

(87) PCT Pub. No.: WO2019/045692
PCT Pub. Date: Mar. 7, 2019

(65) Prior Publication Data
US 2020/0173827 A1 Jun. 4, 2020

(51) Int. Cl.
*G01F 1/84* (2006.01)

(52) U.S. Cl.
CPC .................. *G01F 1/8413* (2013.01)

(58) Field of Classification Search
None
See application file for complete search history.

(56) References Cited

U.S. PATENT DOCUMENTS

| | | | | |
|---|---|---|---|---|
| 5,448,921 A | * | 9/1995 | Cage | G01F 1/8409 73/861.355 |
| 5,987,998 A | * | 11/1999 | Campbell | G01F 1/8477 73/861.356 |
| 6,415,668 B1 | | 7/2002 | Cage | |
| 2015/0033874 A1 | | 2/2015 | Wang et al. | |
| 2016/0202101 A1 | | 7/2016 | Sparks | |

* cited by examiner

*Primary Examiner* — Harshad R Patel
(74) *Attorney, Agent, or Firm* — The Ollila Law Group LLC

(57) ABSTRACT

A flow conduit assembly (300), a method for making the same, a brace bar (304), and a vibrating flowmeter including the flow conduit assembly are provided. The flow conduit assembly includes a first flow tube (302), a second flow tube (303), and a first brace bar (304) coupled to the first flow tube, wherein the first brace bar does not enclose the first flow tube and the second flow tube.

29 Claims, 11 Drawing Sheets

INTEGRATED BRACE BAR

TECHNICAL FIELD

The present Application relates to brace bars, and more particularly, to a brace bar for a flow conduit assembly.

TECHNICAL FIELD

Vibrating flowmeters, such as, for example, densitometers and Coriolis sensors, are used for measuring a characteristic of flowing substances. For example, a vibrating flowmeter may measure a density, mass flow rate, volume flow rate, totalized mass flow, temperature, or any other information with regards to a fluid. Vibrating flowmeters include one or more flow conduits, which may have a variety of shapes, such as, for example, straight, U-shaped, or irregular configurations. The one or more flow tubes have a set of natural vibration modes, including, for example, simple bending, torsional, radial, and coupled modes. The one or more flow tubes are vibrated by at least one drive at a resonance frequency in one of these modes for purposes of determining a characteristic of the flowing substance.

FIG. 1 depicts a cut-away view of an example vibrating flowmeter 100. For example, vibrating flowmeter 100 may be a Coriolis flowmeter or sensor. Vibrating flowmeter 100 includes four brace bars 102, a case 104, two flow tubes 106, and two manifolds 108. In the example of vibrating flowmeter 100, the two flow tubes 106 each include four bends to form a U-shaped configuration. Manifolds 108 couple flow conduits 106 to the case 104 at the inlet and outlet of the vibrating flowmeter 100. Brace bars 102 couple the flow tubes 106 to one another.

Vibrating flowmeter 100 further includes one or more electronics that transmit a sinusoidal drive signal to a driver 110, which is typically a magnet/coil combination with the magnet typically being affixed to one of the flow conduits 106 and with the coil typically being affixed to a supporting structure or to a second of the flow conduits 106. The drive signal causes the driver to vibrate the flow conduits 106 at a resonance frequency in one of the natural modes of the flow conduits 106. For example, the drive signal may be a periodic electrical current transmitted to the coil.

Vibrating flowmeter 100 may include at least one pickoff 112*l*, 112*r* that detects the motion of a flow tube and generates a sinusoidal pick-off signal representative of the motion. Like driver 110, pickoffs 112*l*, 112*r* are typically affixed to the one of the flow conduits 106 and with the coil typically being affixed to a supporting structure or to a second of the flow conduits 106. The pick-off signal is transmitted to the one or more electronics, which, according to well-known principles, determines a characteristic of the flowing substance or adjusts the drive signal, if necessary.

A vibrating flowmeter may include brace bars 102 that connect two flow conduits 106 together. Vibrating flowmeters typically include one or more brace bars towards the inlet or outlet of a meter. In the example of vibrating flowmeter 100, four brace bars 102 are positioned symmetrically on flow conduits 106, with two brace bars 102 positioned between a manifold 108 and a first bend at each of an inlet and an outlet end of vibrating flowmeter 100. Brace bar 102 allows for separation between a natural frequency of the flow conduits 106, or a frequency at which the flow conduits are typically driven to determine a characteristic of a flowing substance, and other modes of vibration existing in the structure. Accordingly, by varying the number and position of brace bars 102, the frequency at which the various modes of vibration will be induced in vibrating flowmeter 100 may be somewhat controlled. Furthermore, it may also be desirous to use brace bars 102 to reduce stress on the flow tubes 106 as they oscillate, particularly to reduce stress on the connecting area between a manifold or flange found at the inlet or outlet and the flow conduits 106.

FIG. 2 depicts a top view of brace bar 102. As may be seen from FIG. 2, each brace bar 102 includes two apertures 202 for receiving two flow tubes 106 that may be passed through each of the apertures 202. Brace bar 102 allows two flow tubes 106 to be connected into a single vibrating structure. However, for a brace bar to be effective in this capacity, it is critical that that brace bar maintain a proper alignment.

While the design of brace bar 102 may be easy to manufacture, assembling a vibrating flowmeter with brace bars 102 may present a challenge. Firstly, when threading brace bar 102 onto flow tubes 106, it is possible to damage flow tubes 106. The apertures 202 of brace bar 102 must therefore be large enough to allow it to be threaded onto flow tubes 106, without causing damage to the flow tubes 106.

Secondly, it is possible to damage flow tubes 106 when coupling brace bar 102 to them. To ensure that it is feasible to braze or weld brace bar 102 to flow tubes 106, apertures 202 must also be small enough to leave a relatively small gap around flow tubes 106. Because the circular flow tubes 106 take a slightly ovalized shape when bent, however, the distance between apertures 202 and flow tubes 106 may vary, meaning that a fillet weld coupling the parts may also vary in size. The challenge of coupling brace bar 102 and flow tubes 106 with an uneven gap may therefore increase the risk of weld bead penetration. This could lead to defects such as cracking, especially if the flow tube 106 walls are thin. Bead penetration can also lead to a partial blockage of the internal flow path, which is especially problematic in small meters where a small penetration can cause a significant reduction in flow area.

Because prior brace bar 102 apertures 202 surround flow tubes 106, they require extra brace bar material. In addition, because the design of brace bar 102 extends into the area outside of the flow tubes 106, brace bar 102 requires a larger vibratory meter case, which further requires additional material and weight.

What is needed is a brace bar that is easy to manufacture, doesn't damage flow tubes when assembling, uses less material, and allows for a more compact case.

SUMMARY

A flow conduit assembly is provided. The flow conduit assembly comprises a first flow tube, a second flow tube, and a first brace bar coupled to the first flow tube and the second flow tube, wherein the first brace bar does not enclose the first flow tube or the second flow tube.

A vibrating flowmeter is provided. The vibrating flowmeter comprises a flow conduit assembly as claimed in the first aspect, a pickoff attached to the first flow tube and the second flow tube, and a driver coupled to the first flow tube and the second flow tube, the driver being configured to vibrate the first flow tube and the second flow tube.

A brace bar is provided. The brace bar comprises a first longitudinal surface, a second longitudinal surface opposite the first longitudinal surface, a first end surface, a second end surface opposite the first end surface, a first coupling surface contoured inwards for coupling to a first flow tube, and a second coupling surface opposite the first coupling surface, contoured inwards for coupling to a second flow tube.

A method for manufacturing a flow conduit assembly is provided. The method comprises providing a first brace bar, providing a first flow tube, providing a second flow tube, and coupling the first brace bar to the first flow tube and the second flow tube, wherein the first brace bar does not enclose the first flow tube and the second flow tube.

ASPECTS

In a further aspect, the first brace bar may be positioned entirely within a volume between the first flow tube and second flow tube.

In a further aspect, the first brace bar may be substantially planar in shape.

In a further aspect, the first brace bar may include a longest dimension in a direction perpendicular to the axis of the first flow tube.

In a further aspect, the first brace bar may include a longest dimension along a longitudinal length of the first flow tube.

In a further aspect, the brace bar, the first flow tube, and the second flow tube may include a bend.

In a further aspect, the first brace bar may be integrated with the first flow tube.

In a further aspect, the first brace bar may also be integrated with the second flow tube.

In a further aspect, the flow conduit assembly may further comprise a second brace bar coupled to the first flow tube and the second flow tube.

In a further aspect, the flow conduit assembly may further comprise a manifold coupled to the first flow tube or the second flow tube.

In a further aspect, the manifold may be integrated with at least one of the first flow tube and the second flow tube.

In a further aspect, the flow conduit assembly may further comprise a bracket integrated with the first flow tube.

In a further aspect, the first coupling surface may form a cylindrical cross section.

In a further aspect, the brace bar may be substantially planar in shape.

In a further aspect, the first coupling surface may form a bent cylindrical cross section.

In a further aspect, the first brace bar may include a longest dimension in a direction perpendicular to the first end surface.

In a further aspect, the first brace bar may be positioned entirely within a volume between the first flow tube and second flow tube.

In a further aspect, the first brace bar may be substantially planar in shape.

In a further aspect, the first brace bar may include a longest dimension in a direction perpendicular to the axis of the first flow tube.

In a further aspect, the first brace bar may include a longest dimension along a longitudinal length of the first flow tube.

In a further aspect, the first brace bar, the first flow tube, and the second flow tube may include a bend.

In a further aspect, the method may further comprise providing a second brace bar, and coupling the second brace bar to the first flow tube and the second flow tube.

In a further aspect, the first brace bar may be integrated with the first flow tube.

In a further aspect, the first brace bar may be further integrated with the second flow tube.

In a further aspect, the second brace bar may be integrated with at least one of the first flow tube and the second flow tube.

In a further aspect, the first flow tube, second flow tube, and first brace bar may be formed via a three-dimensional printing technique.

BRIEF DESCRIPTION OF THE DRAWINGS

The same reference number represents the same element on all drawings. The drawings are not necessarily to scale.

DETAILED DESCRIPTION

The present Application describes a novel brace bar, and a flow conduit assembly and a vibrating meter including the brace bar, and a method of manufacturing the same.

Figure 1:
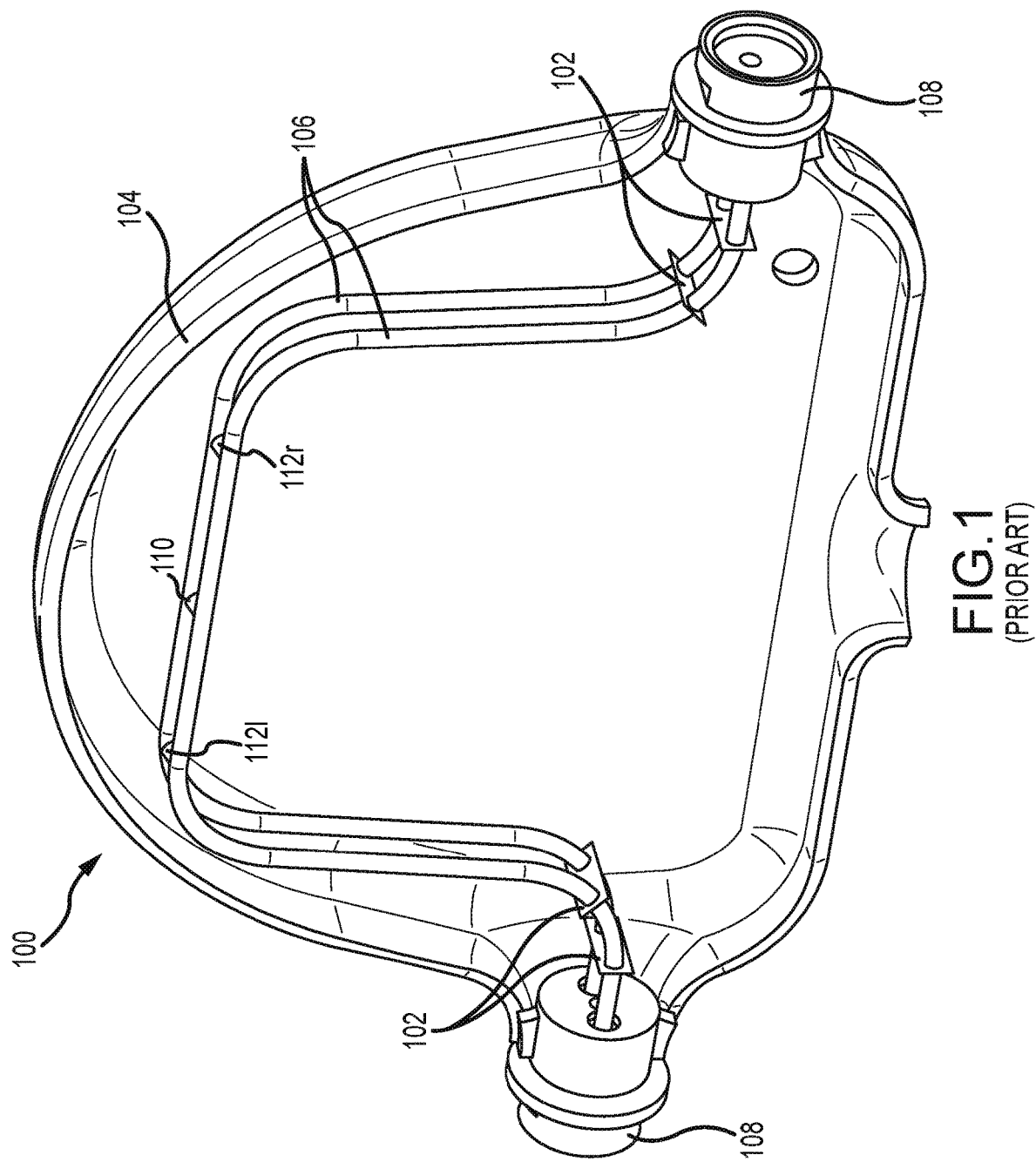
FIG. 1 depicts a vibrating flowmeter 100, in accordance with an example.
Figure 2:
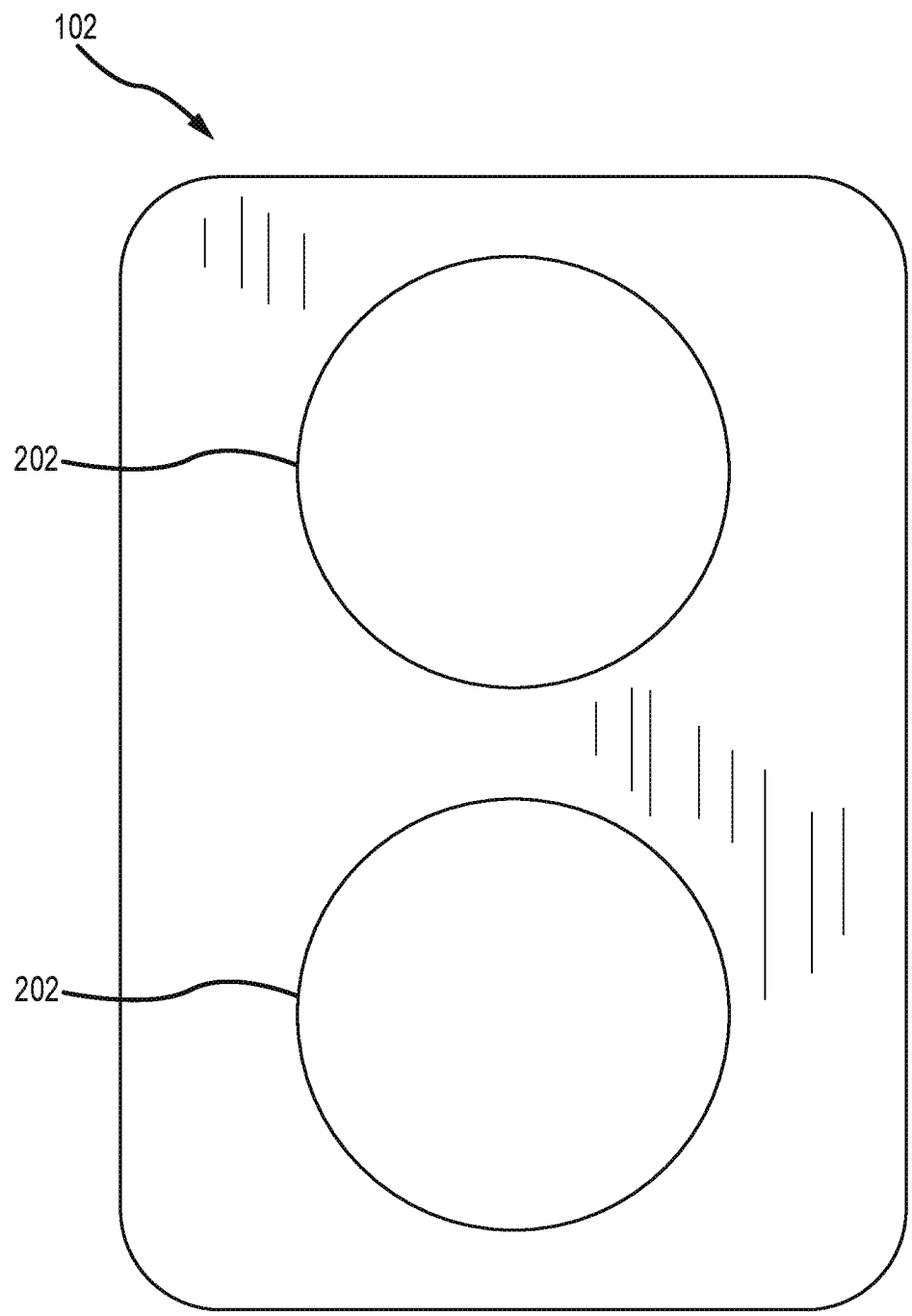
FIG. 2 depicts a brace bar 200.
Figure 3:
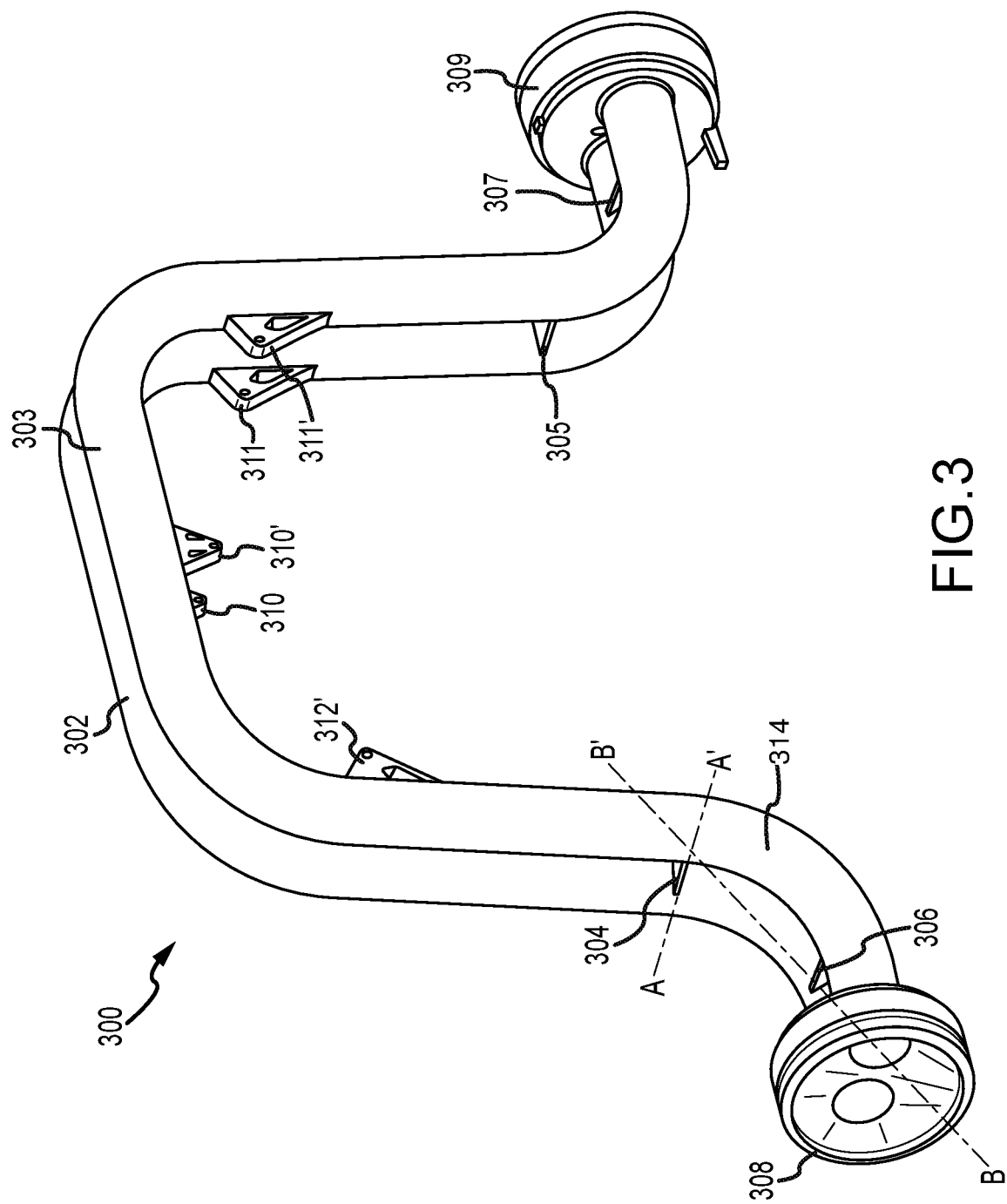
FIG. 3 depicts a flow conduit assembly 300, in accordance with an example.

FIG. 3 depicts a flow conduit assembly 300, in accordance with an example. Flow conduit assembly 300 may be included in a vibrating flowmeter, such as vibrating flowmeter 100, described above. For example, flow conduit assembly 300 may replace any combination of flow tubes 106, brace bars 102, and manifolds 108, as described with reference to vibrating flowmeter 100.

Flow conduit assembly 300 includes a first flow tube 302, a second flow tube 303, and a first brace bar 304 coupled to the first flow tube 302, wherein the first brace bar 304 does not enclose the first flow tube 302 and the second flow tube 303.

First and second flow tubes 302, 303 are conduits that can conduct fluid through vibrating flowmeter 100. In the example of FIG. 3, first and second flow tubes 302, 303 are depicted as circular in shape. This is not intended to be limiting, however, as other flow tube perimeter shapes are possible, as will be understood by those of skill.

While FIG. 3 depicts flow tubes 302, 303 as including four bends, forming a U-shape, this is not intended to be limiting. As those of skill will readily understand, further orientations of flow tubes are also possible, including straight flow tubes or flow tubes with other variations of bends.

Flow conduit assembly 300 includes brace bar 304. A brace bar couples two flow tubes together. A brace bar may be positioned and designed to select the modes of a flow conduit assembly, or to reduce the strain on the joints between flow tubes and manifolds of a flow conduit assembly.

As may be seen in FIG. 3, first brace bar 304 does not enclose first flow tube 302 and second flow tube 303, the way that prior art brace bar 102 did with its dual aperture 202 design. In other words, first brace bar 304 does not surround the perimeter of first flow tube 302 and second flow tube 303.

By providing a brace bar without the apertures found in the prior art, it may be possible to simplify the assembly of a vibrating flowmeter. Brace bar 304 does not need to be threaded onto flow tubes 302 and 303, and therefore there is reduced risk of damaging the flow tubes during assembly. Because brace bar 304 may be formed to conform to the portions of flow tubes 302 and 303 where it is designed to be coupled, instead of designed with apertures large enough to be threaded along sections of the flow tubes to the coupling position, brace bar 304 may reduce the gap between the flow tubes and the brace bar, or even eliminate the gap altogether. This may allow for easier coupling of brace bar 304 to flow tubes 302 and 303, especially when brazing or spot-welding.

Brace bar 304 further provides a minimal design that may use less material than prior designs, saving money on manufacturing, and reducing the weight of the assembled vibrating meter. Because brace bar 304 does not encircle the flow tubes, it may further allow for a more compact case design. A compact case design may further reduce the materials needed to build a case, providing for a more compact, reduced weight vibrating meter.

In examples, first brace bar 304 may be coupled to first and second flow tubes 302, 303. For example, first brace bar 304 may be brazed, spot welded, fastened, or glued to first and second flow tubes 302, 303.

Figure 4:
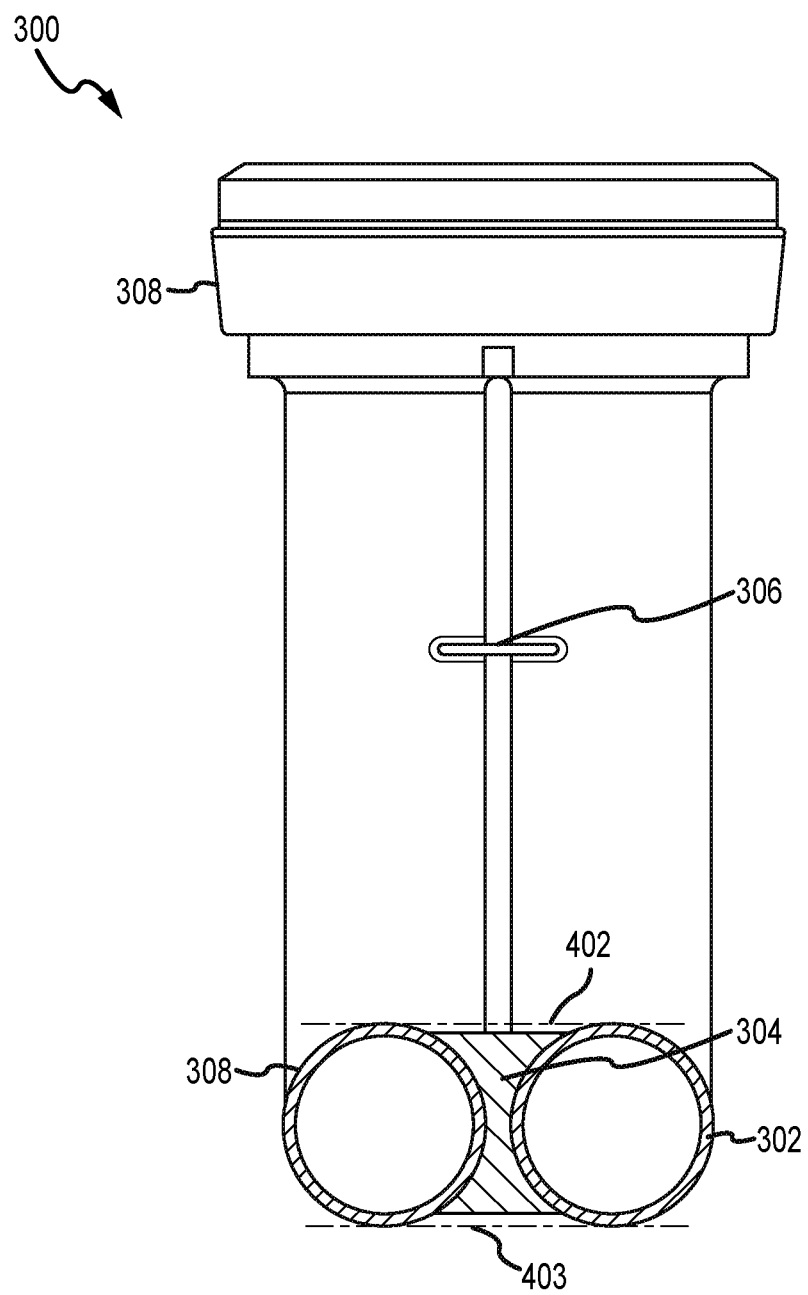
FIG. 4 depicts a cross-section of flow conduit assembly 300, in accordance with an example.
Figure 5:
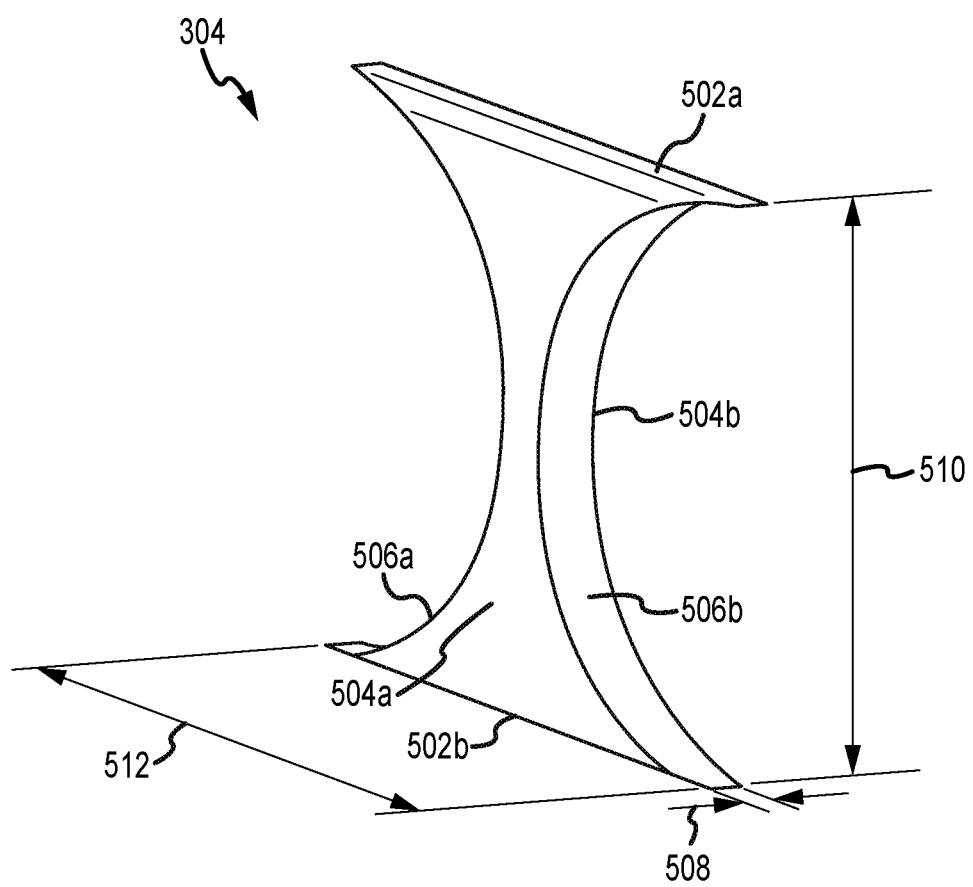
FIG. 5 depicts a brace bar 304, in accordance with an example.
Figure 6:
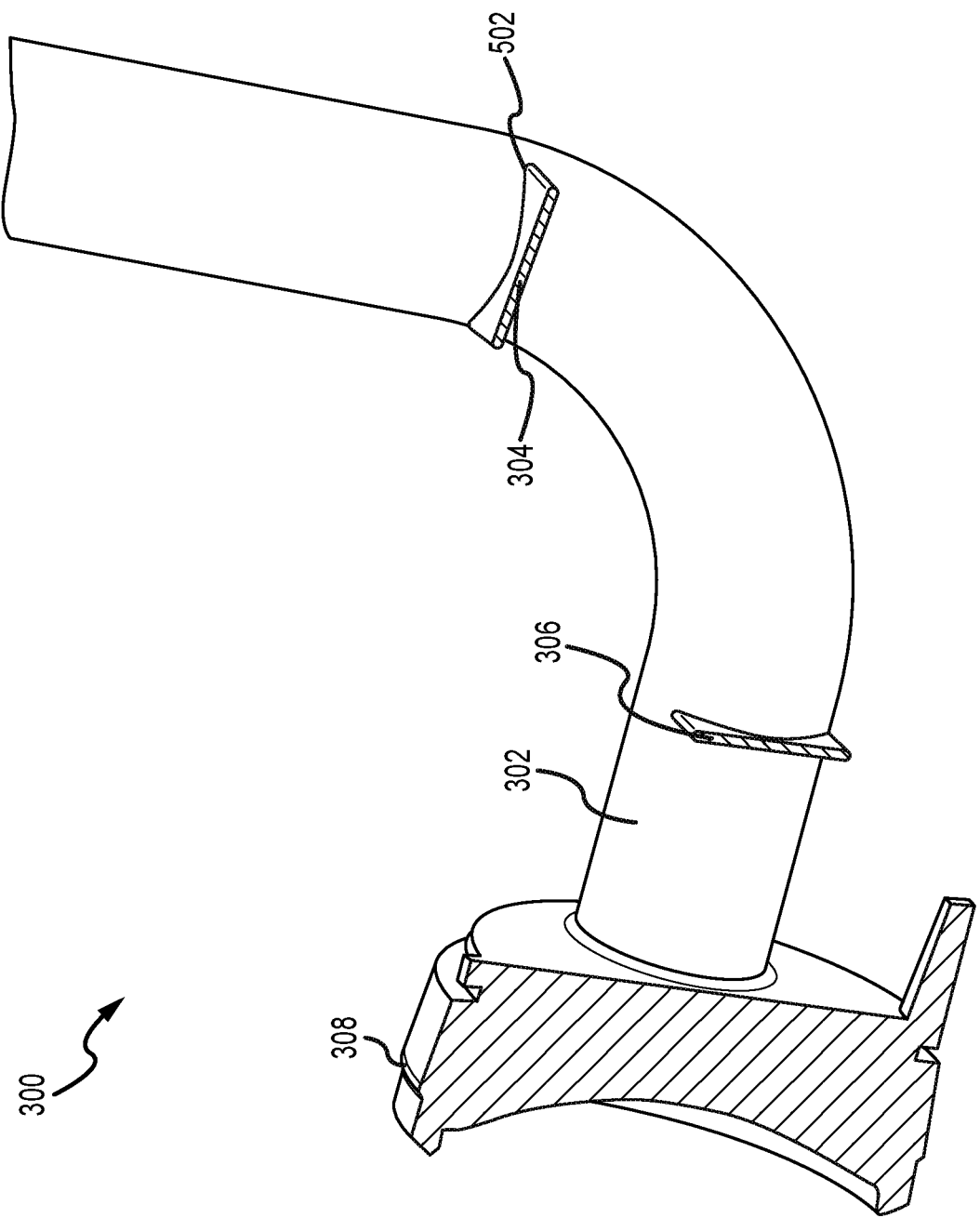
FIG. 6 depicts a cross-section of flow conduit assembly 300, in accordance with an example.

Further views of first brace bar 304 are provided in FIGS. 4, 5 and 6. FIG. 4 depicts the cross-section A-A' of flow conduit assembly 300 represented in FIG. 3. FIG. 5 depicts a perspective view of brace bar 304 without flow conduits. Finally, FIG. 6 depicts the cross-section B-B' of flow conduit assembly 300 represented in FIG. 3.

In examples, the first brace bar may be positioned entirely within a volume between the first flow tube and second flow tube. For example, FIG. 4 depicts a cross-sectional slice of brace bar 304 coupled to flow tubes 302, 303. The area between the first flow tube and the second flow tube may be defined as the space between first end 402, second end 403, and the area between the perimeters of flow tubes 302, 303. First end and second end 402, 403 may each represent a respective plane where first and second flow tube 302, 303 diameters are their widest in a direction perpendicular to the longitudinal axis of the flow tubes, and perpendicular to the axis of alignment of the flow tubes. The volume between the first flow tube and the second flow tube may be determined by integrating the area between the first flow tube and the second flow tube along the longitudinal length of flow conduit assembly 300.

In the example of flow tube 300, it may be seen that brace bar 304 forms an hourglass cross-sectional shape, with each of the contouring inwards portions coupled to a flow tube, and two straight portions parallel to, but within the boundaries defined by first and second ends 402 and 403. Brace bar 304 is therefore positioned entirely within a volume between the first flow tube and second flow tube. This may allow for a minimal brace bar that uses less material, weighs less, and takes up less room than prior brace bar designs, which may also provide for a more compact meter design.

FIG. 5 provides a view of brace bar 304. Brace bar 304 includes a first longitudinal surface 502a, a second longitudinal surface 502b opposite the first longitudinal surface, a first end surface 504a, a second end surface 504b opposite the first end surface 504a, a first coupling surface 506a contoured inwards for coupling to a first flow tube, and a second coupling surface 506b opposite the first coupling surface, contoured inwards for coupling to a second flow tube.

First and second longitudinal surfaces 502a, 502b are positioned substantially parallel to first and second ends 402 and 403. In the example of brace bar 304, first and second longitudinal surfaces 502a, 502b form a flat, rectangular surface. In further examples, however, first and second longitudinal surfaces 502a, 502b may be trapezoidal, beveled, or comprise any other shape known to those of skill.

First and second end surfaces 504a, 504b are perpendicular to both the first and second longitudinal surfaces 502a, 502b, and the axis of the flow tube. In the example of brace bar 304, first and second end surfaces 504a, 504b provide a cross-section of an hourglass.

First coupling surface 506a is contoured inwards to fit closely to flow tube 303, and second coupling surface 506b is contoured inwards to fit closely to flow tube 302. In the example of flow conduit assembly 300, first and second flow tubes 302 and 303 are cylindrical in shape, or circular in cross section. Therefore, first and second coupling surfaces 506a and 506b form cylindrical cross sections to provide for a secure coupling to the circular flow tubes 302, 303. The example of flow conduit assembly 300 is not intended to be limiting, however. In further examples, flow tubes 302, 303 may be oval, square, diamond shaped, hexagonal shaped, or any other shape known to those of skill. In these additional examples, first and second coupling surfaces 506a and 506b, while continuing to contour inwards for coupling to flow tubes 302, 303, may take a different shape to conform to the exterior shape of the flow tube perimeter.

In examples, the first brace bar may be substantially planar in shape. By substantially planar, first brace bar 304 may be primarily contained in a rectangular volume with a depth that is a small proportion of the length and width. For example, FIG. 5 depicts a cross section of brace bar 304 that is primarily contained within a rectangular volume with a depth d 508 that is small compared to a length 1510 or a width w 512. By providing a substantially planar brace bar, this may provide an even more minimal brace bar design.

In examples, first brace bar 304 may include a longest dimension in a direction perpendicular to the axis of the first flow tube. For example, first brace bar 304 includes a longest dimension in the direction of length 1510.

In examples, flow conduit assembly 300 may further include a second brace bar coupled to the first flow tube. For example, flow conduit assembly 300 may further include any combination of brace bars 305, 306, or 307. In examples, brace bars 305, 306, or 307 may be substantially the same as brace bar 304, as depicted in FIG. 3, or different.

In examples, the first brace bar may be integrated with the first flow tube. In further examples, however, the first brace bar may also be integrated with the second flow tube.

By integrated, brace bar 304 may be formed with at least the portion of first flow tube 302 to which brace bar 304 is coupled, so that there is no need to perform the additional step of coupling brace bar 304 to first flow tube 302. Brace bar 304 and first flow tube 302 may be formed as an integrated unit, for example, via additive three-dimensional (3D) printing techniques, such as stereolithography, digital light processing, fused deposition modeling, selective laser sintering, selective laser melting, electronic beam melting, or laminated object manufacturing, via injection molding, or via subtractive manufacturing techniques, such as machining, electrical discharge machining, electrochemical machining, electron beam machining, photochemical machining, or ultrasonic machining. Integrated brace bar 304, first flow tube 302, and/or second flow tube 303 may also be formed via any further technique known to those of skill.

By providing an integrated brace bar that does not require assembly with the first flow tube, the chances of damaging the flow conduit assembly during manufacture due to welding errors, or inadvertently bending the flow tubes during assembly, may be reduced, thereby creating a more robust vibratory flow meter.

By forming the integrated brace bar via 3D printing, injection molding, or subtractive manufacturing, it also may be possible to provide a more precise positioning of the brace bar with respect to the flow tube. Forming the integrated brace bar via 3D printing, injection molding, or subtractive manufacturing may further allow the thickness of the brace bar to be easily adjusted, without causing brazing issues between the flow tube and the brace bar.

Without the need to assemble the first brace bar and the first flow tube, this may allow for a vibrating flowmeter that minimizes space between the tubes, providing for a more compact vibrating flowmeter. This may require less material for the brace bar and the vibrating flowmeter case. Minimizing the space between the flow tubes, may further allow for simpler manifold geometries, or for manifold geometries with more narrowly designed branches leading to the flow tubes.

In further examples, the flow conduit assembly may further comprise a manifold coupled to the first flow tube and the second flow tube. Because brace bar 304 may provide for more closely spaced flow tubes, the manifold may provide a simplified design with narrower manifold branches, preventing some of the pressure drop experienced by prior art vibrating flowmeter manifold designs. In addition, because voids in the manifold may be more easily filled with process fluid, especially at high fluid velocity, the improved manifold may allow for easier cleaning, which is particularly useful for the hygienic market.

In further examples, however, manifold 308, 309 may be formed integral to at least one of flow tubes 302 and 303. Providing a flow conduit assembly with an integrated manifold may allow for a flow conduit assembly that requires less assembly, providing for fewer meter defects, and less potential for damage due to welding during assembly.

In examples, a bracket may be integrated with the first flow tube. A bracket may allow for the attachment of an additional component to flow conduit assembly 300. For example, bracket 310 may be integrated to flow tube 302 to allow for the coupling of driver 110 to flow conduit assembly 300. In other examples, bracket 311 may allow for the coupling of pickoff 112*r* to flow tube 302, and a further bracket (not pictured) may allow for the coupling of pickoff 112*l* to flow tube 302. Similarly, bracket 310' may allow for the coupling of driver 110, brackets 311' may allow for the coupling of pickoff 112*r*, and bracket 312' may allow for the coupling of pickoff 112*l* to flow tube 303.

By providing for an integrated bracket instead of a coupled bracket, as practiced in many prior designs, it may be possible to further reduce damage to flow tubes 302, 303 when assembling flow conduit assembly 300.

Figure 7:
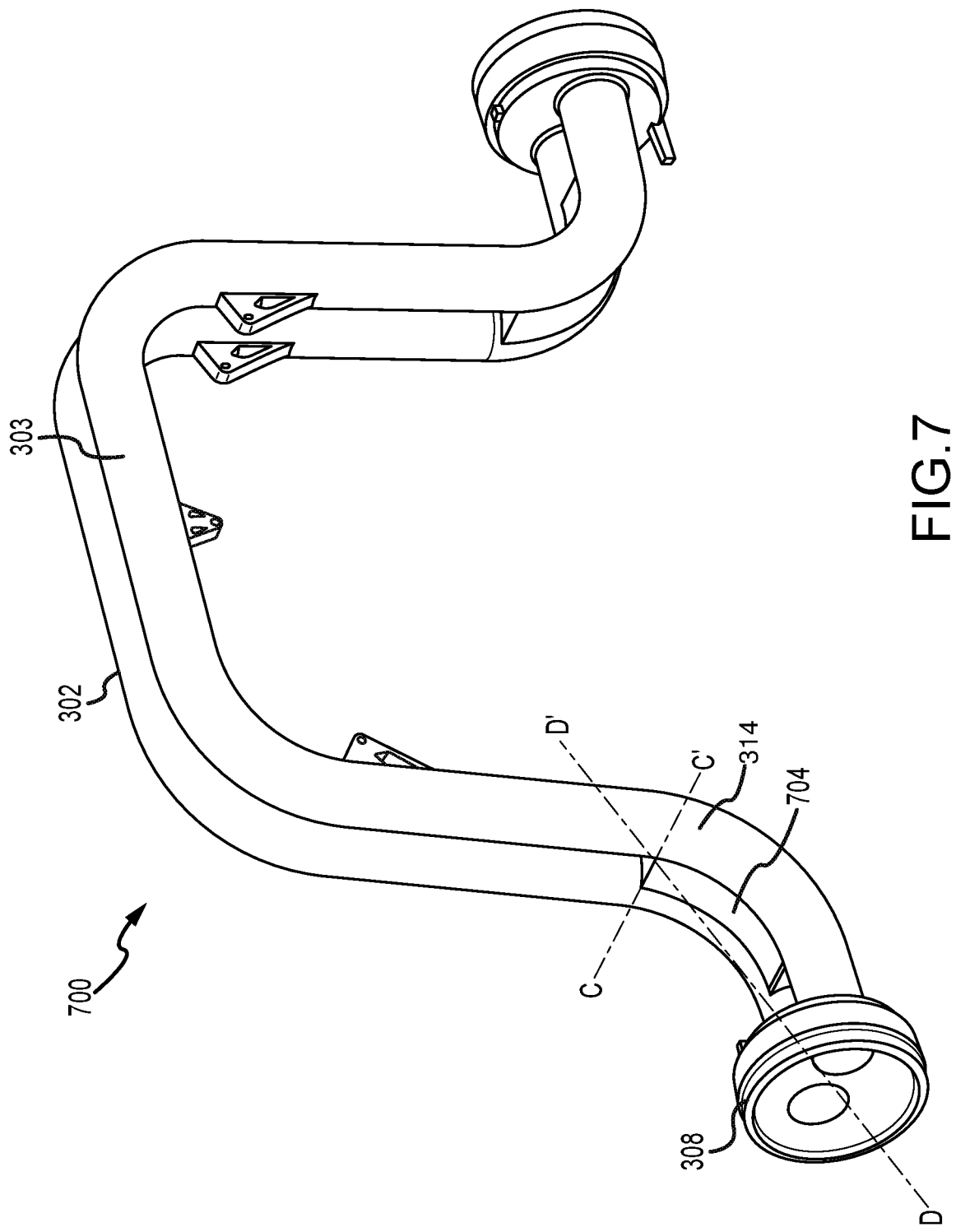
FIG. 7 depicts a flow conduit assembly 700, in accordance with an example.

FIG. 7 depicts a flow conduit assembly 700, in accordance with a further example. Flow conduit assembly 700 is like flow conduit assembly 300, except that it includes example brace bar 704.

Figure 8:
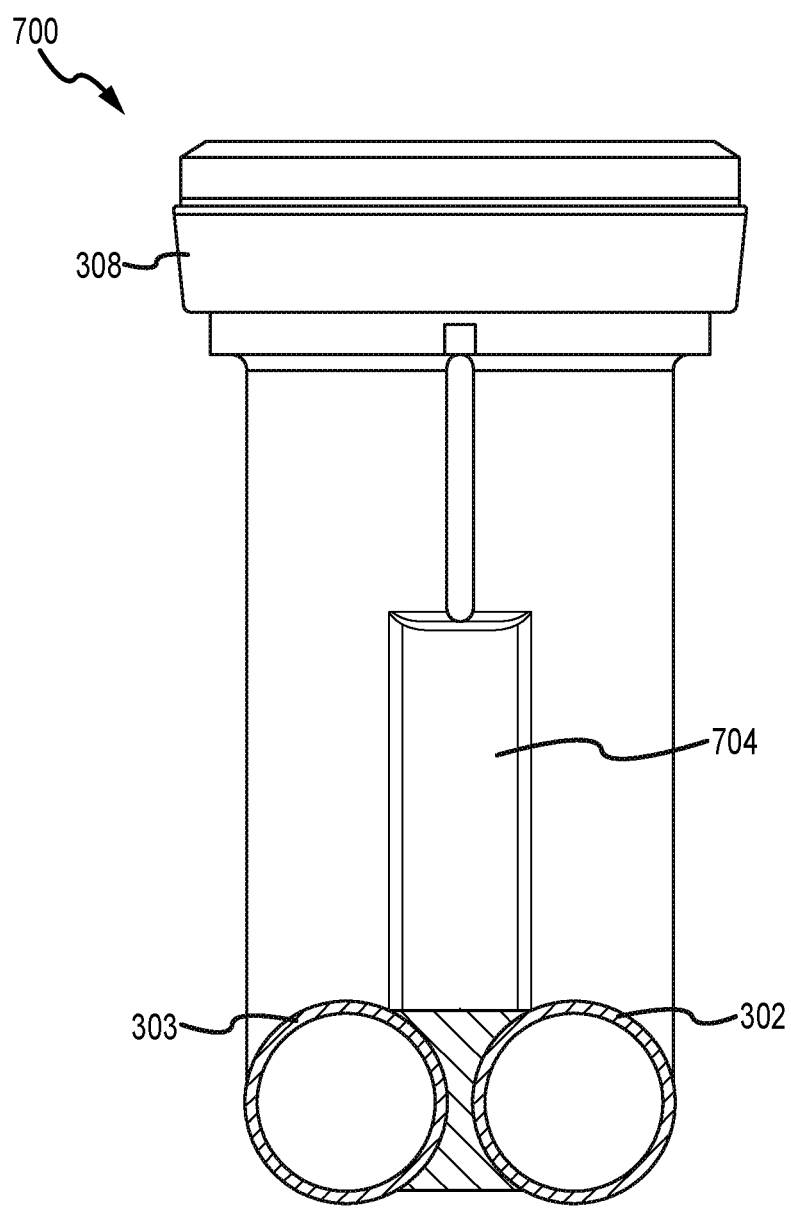
FIG. 8 depicts a cross-section of flow conduit assembly 700, in accordance with an example.
Figure 9:
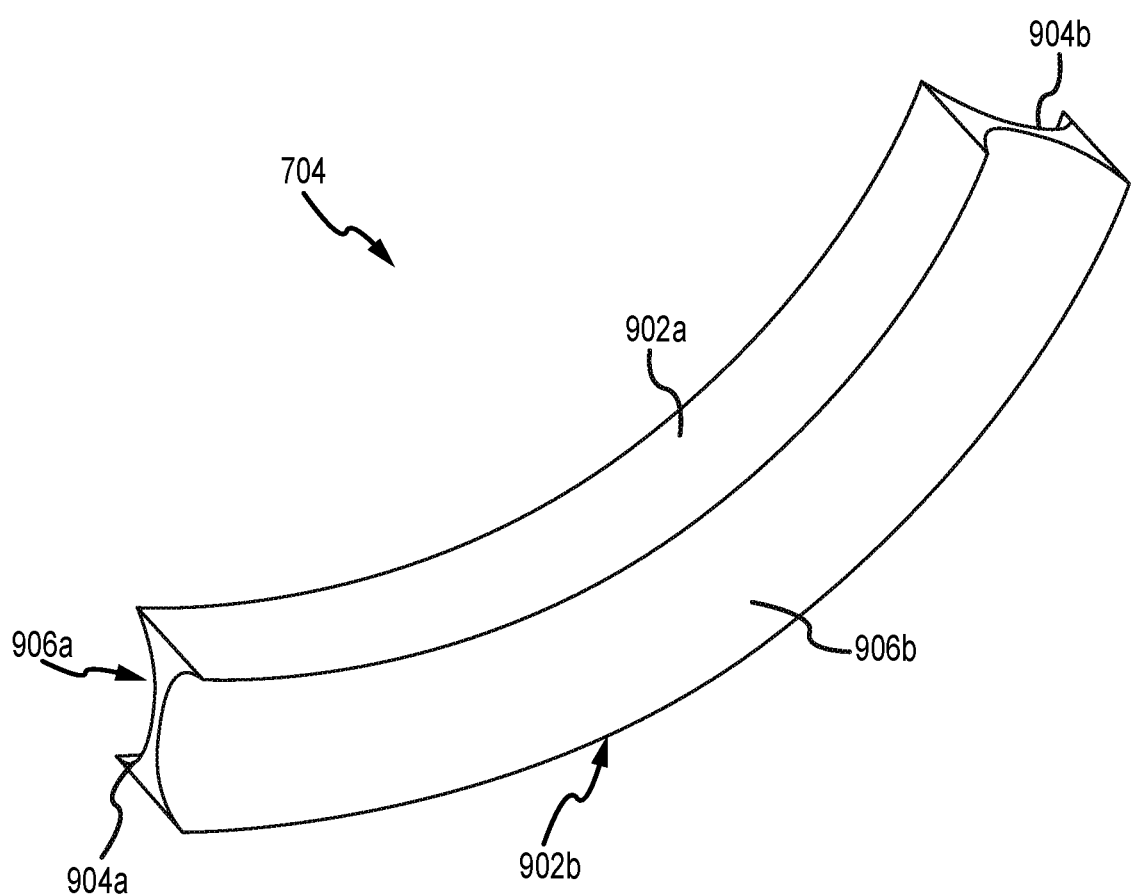
FIG. 9 depicts a brace bar 704, in accordance with an example.
Figure 10:
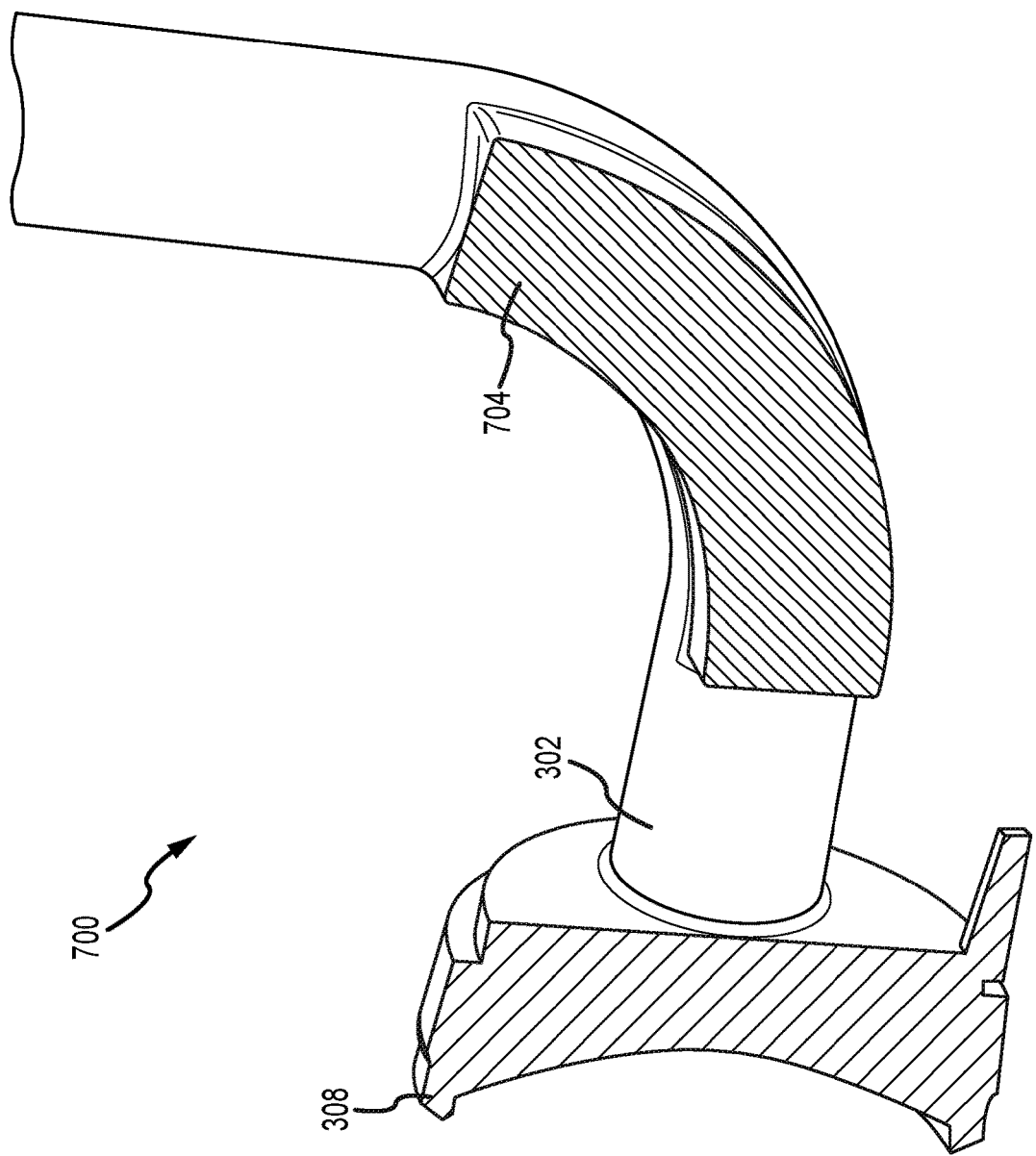
FIG. 10 depicts a cross-section of flow conduit assembly 700, in accordance with an example.

Further views of flow conduit assembly 700 and first brace bar 704 are provided in FIGS. 8, 9, and 10. FIG. 8 depicts a cross-section C-C' of flow conduit assembly 700, as represented in FIG. 7, and FIG. 10 depicts a cross-section D-D' of flow conduit assembly 700 also represented in FIG. 7. FIG. 9 depicts a perspective view of brace bar 704.

Brace bar 704 is like brace bar 304, except that it extends further along the longitudinal direction of flow tubes 302, 303. Example brace bar 704 includes a longest dimension along a longitudinal length of the first flow tube. As may be seen in FIGS. 7, 8, and 10, first brace bar 704 runs along a length of flow tubes 302, 303.

FIG. 9 depicts brace bar 704 without flow tubes. Brace bar 704 includes a first longitudinal surface 902*a*, a second longitudinal surface 902*b* opposite the first longitudinal surface, a first end surface 904*a*, a second end surface 904*b* opposite the first end surface 904*a*, a first coupling surface 906*a* contoured inwards for coupling to a first flow tube, and a second coupling surface 906*b* opposite the first coupling surface, contoured inwards for coupling to a second flow tube. First and second longitudinal surfaces 902*a*, 902*b*, and first and second coupling surfaces 906*a*, 906*b* are longer than their counterparts in brace bar 304.

Brace bar 704 may provide a stronger coupling between flow tubes 302, 303, over the smaller brace bar 304, while continuing to provide the advantages of a low profile, compact design.

In examples, a brace bar, a first flow tube, and a second flow tube may further include a bend. For example, it may be seen in FIGS. 7-10 that first and second flow tubes 302, 303, and brace bar 704 include bend 314.

In examples, the first coupling surface may include a bent cylindrical cross section. For example, it may be seen that coupling surface 906*b* is contoured inwards to be fitted to a bent cylindrical flow tube. Coupling surface 906*b* therefore takes the form of a bent cylindrical cross section.

By providing for brace bar 704 with a bend, it may be possible to couple a brace bar to a flow tube bend without damaging the flow tube, as often happened with prior brace bar designs that included apertures that needed to be threaded over a bend into place. Moreover, because brace bar 704 may be formed to precisely couple to a specific section of a flow tube including a bend, it may be easier to align brace bar 704 precisely during assembly.

In examples, flow conduit assemblies 300 or 700 may be incorporated into a vibrating flowmeter. The vibrating flowmeter may further include a pickoff attached to the first flow tube and the second flow tube. For example, a vibratory flow meter may include a pickoff 112*l*, 112*r*, coupled to brackets 311, 311', or 312, 312', as described above. In further examples, a vibratory flow meter may include a pickoff 112*l*, 112*r* coupled to first and second flow tubes 302 and 303 via any other technique known in the art.

The vibrating flowmeter may further include a driver coupled to the first flow tube and the second flow tube, the driver being configured to vibrate the first flow tube and the second flow tube. For example, a vibratory flow meter may include driver 110 coupled to brackets 310, 310', as described above. In further examples, however a vibratory flow meter may include driver 110 coupled to first and second flow tubes 302 and 303 via any other technique known in the art.

Figure 11:
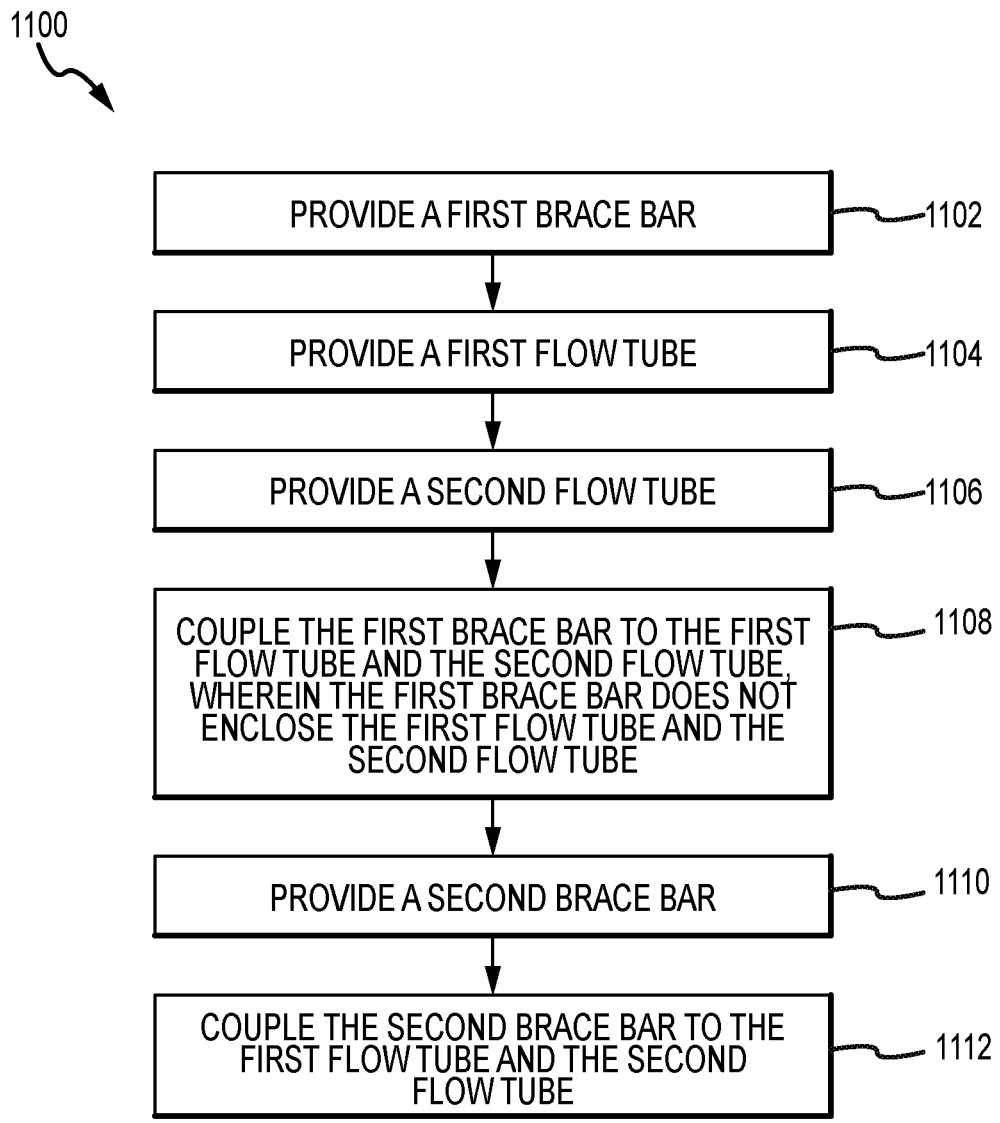
FIG. 11 depicts a method 1100, in accordance with an example.

FIG. 11 depicts method 1100. Method 1100 may be used to manufacture a flow conduit assembly. For example, method 1100 may be used to manufacture flow conduit assembly 300 or 700, providing the benefits described above.

Method 1100 begins with step 1102. In step 1102, a first brace bar is provided. For example, brace bars 304, 306, or 704 may be provided. The first brace bar may be formed via any method known to those of skill, including, but not limited to any extractive, additive, casting, injection molding, or forming process, or any combination thereof.

In step 1104, a first flow tube is provided, and in step 1106, a second flow tube is provided. For example, first and second flow tubes 302, 303 may be formed via any of the techniques described above. The first and second flow tubes may be formed via any method known to those of skill, including, but not limited to any extractive, additive, casting, injection molding, or forming process, or any combination thereof.

Method 1100 continues with step 1108. In step 1108, a first brace bar is coupled to the first flow tube and the second flow tube, wherein the first brace bar does not enclose the first flow tube and the second flow tube. For example, first brace bar 304, 704 may be coupled to first flow tube 302, as described above. First brace bar 304, 704 may be coupled to first flow tube 302 via any method known to those of skill, including, but not limited to adhesion, fastening, welding, or brazing.

In examples, the first brace bar may be positioned entirely within a volume between the first flow tube and second flow tube, as described above.

In examples, the first brace bar may be substantially planar in shape, as described above.

In examples, the first brace bar may include a longest dimension in a direction perpendicular to the axis of the first flow tube, as described above.

In examples, the first brace bar may include a longest dimension along a longitudinal length of the first flow tube, as described above.

In examples, the first brace bar, the first flow tube, and the second flow tube may include a bend, as described above.

In examples, method 1100 may include further steps. For example, method 1100 may include steps 1110 and 1112. In step 1110, a second brace bar may be provided.

In step 1112, a second brace bar may be coupled to the first flow tube and the second flow tube, as described above.

In examples, the first brace bar may be integrated with the first flow tube. For example, first flow tube 302 may be integrated with first brace bar 304, 704, as described above. In examples, the first brace bar may be further integrated with the second flow tube, as described above.

In examples, the second brace bar may be integrated with the first flow tube. For example, second brace bar 306 may be integrated with first flow tube 302, as described above. In examples, the second brace bar may be further integrated with the second flow tube. For example, second brace bar 306 may be integrated with second flow tube 303, as described above.

In examples, the first flow tube, second flow tube, and first brace bar may be formed via a 3D printing technique. By forming the flow conduit assembly via 3D printing, it may be possible to provide more precise positioning and sizing of brace bars.

In further examples, one or more additional brace bars, manifolds, or brackets may be further formed via a 3D printing technique to form an integrated unit along with the flow conduit assembly. By forming an integrated flow conduit assembly, it may be possible to eliminate the risk of weld bead penetration, meter defects, and eliminate the need to assemble the integrated portions of the flow conduit assembly. Without a need to weld prior art brace bars to the tubes, there is no need to access the space between the flow tubes, and the flow tubes can be spaced closer together. This may provide for a slimmer case, a more compact meter, and simpler manifold geometries. It may also allow for the fabrication of a vibrating flowmeter that uses less material.

The detailed descriptions of the above examples are not exhaustive descriptions of all examples contemplated by the inventors to be within the scope of the Application. Indeed, persons skilled in the art will recognize that certain elements of the above-described examples may variously be combined or eliminated to create further examples, and such further examples fall within the scope and teachings of the Application. It will also be apparent to those of ordinary skill in the art that the above-described examples may be combined in whole or in part to create additional examples within the scope and teachings of the Application. Accordingly, the scope of the Application should be determined from the following claims.

What is claimed is:

1. A flow conduit assembly (300) comprising:
    a first flow tube (302);
    a second flow tube (303); and
    a first brace bar (304, 704) coupled to the first flow tube and the second flow tube, the first brace bar comprising:
        a first coupling surface (506a, 906a) contoured inwards for coupling to a first flow tube; and
        a second coupling surface (506b, 906b) opposite the first coupling surface, contoured inwards for coupling to a second flow tube,
    wherein the first brace bar does not enclose the first flow tube or the second flow tube.

2. A flow conduit assembly as claimed in claim 1, wherein the first brace bar is positioned entirely within a volume between the first flow tube and second flow tube.

3. A flow conduit assembly as claimed in claim 1, wherein the first brace bar is substantially planar in shape.

4. A flow conduit assembly as claimed in claim 1, wherein the first brace bar includes a longest dimension in a direction perpendicular to the axis of the first flow tube.

5. A flow conduit assembly as claimed in claim 1, wherein the first brace bar includes a longest dimension along a longitudinal length of the first flow tube.

6. A flow conduit assembly as claimed in claim 1, wherein the brace bar, the first flow tube, and the second flow tube include a bend (314).

7. A flow conduit assembly as claimed in claim 1, wherein the first brace bar is integrated with the first flow tube.

8. A flow conduit assembly as claimed in claim 1, wherein the first brace bar is also integrated with the second flow tube.

9. A flow conduit assembly as claimed in claim 1, further comprising:
    a second brace bar (306) coupled to the first flow tube and the second flow tube.

10. A flow conduit assembly as claimed in claim 1, further comprising:
    a manifold (308) coupled to the first flow tube or the second flow tube.

11. A flow conduit assembly as claimed in claim 10, wherein the manifold is integrated with at least one of the first flow tube and the second flow tube.

12. A flow conduit assembly as claimed in claim 1, further comprising:

a bracket (310, 311, 312) integrated with the first flow tube.

13. A vibrating flowmeter (100) comprising:
a flow conduit assembly (300, 700) comprising:
a first flow tube (302),
a second flow tube (303), and
a first brace bar (304, 704) coupled to the first flow tube and the second flow tube, the first brace bar comprising:
a first coupling surface (506a, 906a) contoured inwards for coupling to a first flow tube; and
a second coupling surface (506b, 906b) opposite the first coupling surface, contoured inwards for coupling to a second flow tube, wherein the first brace bar does not enclose the first flow tube or the second flow tube;
a pickoff (112l, 112r) attached to the first flow tube (302) and the second flow tube (303); and
a driver (110) coupled to the first flow tube and the second flow tube, the driver being configured to vibrate the first flow tube and the second flow tube.

14. A brace bar (306) comprising:
a first longitudinal surface (502a, 902a);
a second longitudinal surface opposite the first longitudinal surface (502b, 902b);
a first end surface (504a, 904a);
a second end surface (504b, 904b) opposite the first end surface;
a first coupling surface (506a, 906a) contoured inwards for coupling to a first flow tube; and
a second coupling surface (506b, 906b) opposite the first coupling surface, contoured inwards for coupling to a second flow tube.

15. A brace bar as claimed in claim 14, wherein the first coupling surface forms a cylindrical cross section.

16. A brace bar as claimed in claim 14, wherein the brace bar is substantially planar in shape.

17. A brace bar as claimed in claim 14, wherein the first coupling surface forms a bent cylindrical cross section.

18. A brace bar as claimed in claim 14, wherein the first brace bar includes a longest dimension in a direction perpendicular to the first end surface.

19. A method for manufacturing a flow conduit assembly, the method comprising:
providing a first brace bar;
providing a first flow tube;
providing a second flow tube; and
coupling the first brace bar to the first flow tube and the second flow tube, wherein the first brace bar does not enclose the first flow tube and the second flow tube the first brace bar comprising:
a first coupling surface (506a, 906a) contoured inwards for coupling to a first flow tube; and
a second coupling surface (506b, 906b) opposite the first coupling surface, contoured inwards for coupling to a second flow tube.

20. A method as claimed in claim 19, wherein the first brace bar is positioned entirely within a volume between the first flow tube and second flow tube.

21. A method as claimed in claim 19, wherein the first brace bar is substantially planar in shape.

22. A method as claimed in claim 19, wherein the first brace bar includes a longest dimension in a direction perpendicular to the axis of the first flow tube.

23. A method as claimed in claim 19, wherein the first brace bar includes a longest dimension along a longitudinal length of the first flow tube.

24. A method as claimed in claim 19, wherein the first brace bar, the first flow tube, and the second flow tube include a bend.

25. A method as claimed in claim 19, further comprising:
providing a second brace bar; and
coupling the second brace bar to the first flow tube and the second flow tube.

26. A method as claimed in claim 25, wherein the second brace bar is integrated with at least one of the first flow tube and the second flow tube.

27. A method as claimed in claim 19, wherein the first brace bar is integrated with the first flow tube.

28. A method as claimed in claim 27, wherein the first brace bar is further integrated with the second flow tube.

29. A method as claimed in claim 27, wherein the first flow tube, second flow tube, and first brace bar are formed via a three-dimensional printing technique.

* * * * *

UNITED STATES PATENT AND TRADEMARK OFFICE
CERTIFICATE OF CORRECTION

PATENT NO. : 10,801,871 B2  
APPLICATION NO. : 16/640969  
DATED : October 13, 2020  
INVENTOR(S) : Mark James Bell et al.

It is certified that error appears in the above-identified patent and that said Letters Patent is hereby corrected as shown below:

In the Specification

Column 6, Lines 44 and 50, replace "length 1510" with --length 1 510--.

In the Claims

Column 11, Line 16, replace "a pickoff (1121, 112r)" with --a pickoff (112l, 112r)--.

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*